United States Patent
Trent

(10) Patent No.: US 12,229,540 B2
(45) Date of Patent: Feb. 18, 2025

(54) SYSTEMS AND METHODS FOR COMPILE-TIME DEPENDENCY INJECTION AND LAZY SERVICE ACTIVATION FRAMEWORK

(71) Applicant: ORACLE INTERNATIONAL CORPORATION, Redwood Shores, CA (US)

(72) Inventor: Jeffrey Trent, Medford, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 96 days.

(21) Appl. No.: 17/958,132

(22) Filed: Sep. 30, 2022

(65) Prior Publication Data
US 2024/0111507 A1    Apr. 4, 2024

(51) Int. Cl.
G06F 9/44    (2018.01)
G06F 8/41    (2018.01)

(52) U.S. Cl.
CPC .................. *G06F 8/443* (2013.01)

(58) Field of Classification Search
CPC ..................................................... G06F 8/443
See application file for complete search history.

(56) References Cited

U.S. PATENT DOCUMENTS

| | | | |
|---|---|---|---|
| 6,604,140 B1* | 8/2003 | Beck | H04L 67/34 709/201 |
| 8,745,584 B2 | 6/2014 | Huang | |
| 2008/0276231 A1 | 11/2008 | Huang | |
| 2019/0095181 A1* | 3/2019 | Jang | G06F 9/4552 |
| 2021/0329100 A1 | 10/2021 | Knight | |

OTHER PUBLICATIONS

Sipek et al. (Enhancing Performance of Cloud-based Software Applications with GraalVM and Quarkus, 43rd International Convention on Information, Communication and Electronic Technology, Oct. 2020).*

(Continued)

*Primary Examiner* — Hang Pan
(74) *Attorney, Agent, or Firm* — TUCKER ELLIS LLP

(57) ABSTRACT

In accordance with an embodiment, described herein are systems and methods for providing a compile-time dependency injection and lazy service activation framework including generation of source code reflecting the dependencies, and which enables an application developer using the system to build microservice applications or cloud-native services. The framework includes the use of a service registry that provides lazy service activation and meta-information associated with one or more services, in terms of interfaces or APIs describing the functionality of each service and their dependencies on other services. An application's use of particular services can be intercepted and accommodated during code generation at compile-time, avoiding the need to use reflection. Extensibility features allow application developers to provide their own templates for code generation, or provide alternative service implementations for use with the application, other than a reference implementation provided by the framework.

15 Claims, 12 Drawing Sheets

(56) References Cited

OTHER PUBLICATIONS

European Patent Office, International Searching Authority, Notification of Transmittal of The International Search Report and The Written Opinion of the International Searching Authority, or The Declaration dated Jan. 5, 2024 for International Application No. PCT/US2023033482, 11 pages.

"Reification (computer science)"; Wikpedia, Wikimedia Foundation, last edited Jul. 20, 2022, 7 pages, accessed Sep. 7, 2022 from: <https://en.wikipedia.org/wiki/Reification_(computer_science)>.

"Dependency Injection"; Wikipedia, Wikimedia Foundation, last edited Aug. 20, 2022, 12 pages, accessed Sep. 7, 2022 from: <https://en.wikipedia.org/wiki/Dependency_injection>.

"Inversion of control"; Wikipedia, Wikimedia Foundation, last edited Aug. 24, 2022, 5 pages, accessed Sep. 7, 2022 from: <https://en.wikipedia.org/wiki/Inversion_of_control>.

\* cited by examiner

SYSTEMS AND METHODS FOR COMPILE-TIME DEPENDENCY INJECTION AND LAZY SERVICE ACTIVATION FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing and software development, and are particularly directed to systems and methods for providing a compile-time dependency injection and lazy service activation framework including source code generation, which is usable to build microservice applications or cloud-native services.

BACKGROUND

Microservice environments present a software application as a collection of loosely-coupled services that are independently deployable and communicate with one another over a network, for example a cloud network as might be provided by a cloud computing environment.

The microservice approach can be used, for example, to develop software applications or services to be provided in cloud computing environments as cloud-native applications or services.

SUMMARY

In accordance with an embodiment, described herein are systems and methods for providing a compile-time dependency injection and lazy service activation framework including source code generation, which is usable to build microservice applications or cloud-native services.

The framework includes the use of a service registry that provides lazy service activation and meta-information associated with one or more services, in terms of interfaces or APIs describing the functionality of each service and their dependencies on other services.

An application's use of particular services can be intercepted and accommodated during code generation at compile-time, avoiding the need to use reflection. Extensibility features allow application developers to provide their own templates for code generation, or provide alternative service implementations for use with the application, other than a reference implementation provided by the framework.

In this way, the described system and method provides a minimalist, fully static, compile-time based dependency injection framework, which can be used, for example, with Java applications, and which is compliant with injection specifications such as JSR-330.

DETAILED DESCRIPTION

Microservice environments present a software application as a collection of loosely-coupled services that are independently deployable and communicate with one another over a network, for example a cloud network as might be provided by a cloud computing environment.

The microservice approach can be used, for example, to develop software applications or services to be provided in cloud computing environments as cloud-native applications or services. Software development frameworks such as Helidon assist in the development of microservices. For example, as described below, Helidon offers a variety of Standard Edition (SE), MicroProfile (MP), and/or Nima programming models or environments, each of which include a collection of software libraries that support features such as configuration, security, or web server functionality; and provide a software application developer with a foundation upon which to create a microservice.

Generally described, such a software development framework alleviates the need for the application developer to program according to a specific tooling or deployment model, and enables the running of microservices without the need for an application server. Helidon libraries can interoperate with other software development, deployment, and/or monitoring tools such as, for example, Docker, Kubernetes, Prometheus, or OpenTracing.

Microservice Environments

FIGS. 1-4 illustrate various examples of microservice environments that provide a software development framework, in accordance with an embodiment.

In accordance with an embodiment, the components and processes illustrated in FIGS. 1-4, and as further described herein with regard to various embodiments, can be provided as computer software or program code executable by a computer system or other type of processing device, for example a cloud computing system.

Figure 1:
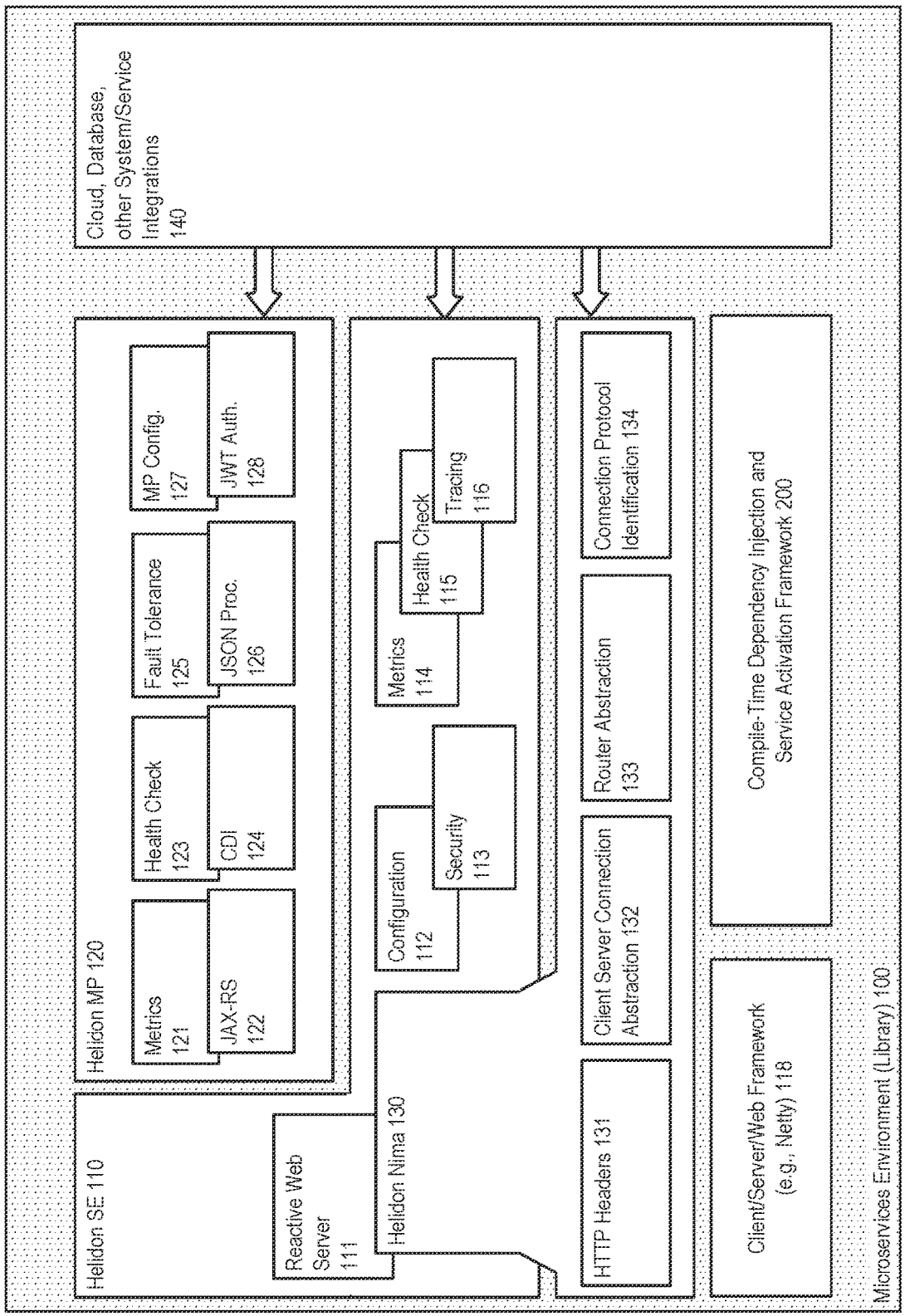
FIG. 1 illustrates various examples of microservice environments that provide a software development framework, in accordance with an embodiment.

As illustrated in FIG. 1, in accordance with an embodiment, a Helidon microservice environment 100 can offer Standard Edition (SE) 110, MicroProfile (MP) 120, and/or Helidon Nima 130 programming models or environments.

In accordance with various embodiments, the microservice environment can also enable interactions y developed applications with cloud, database, or other systems or services 140.

Figure 2:
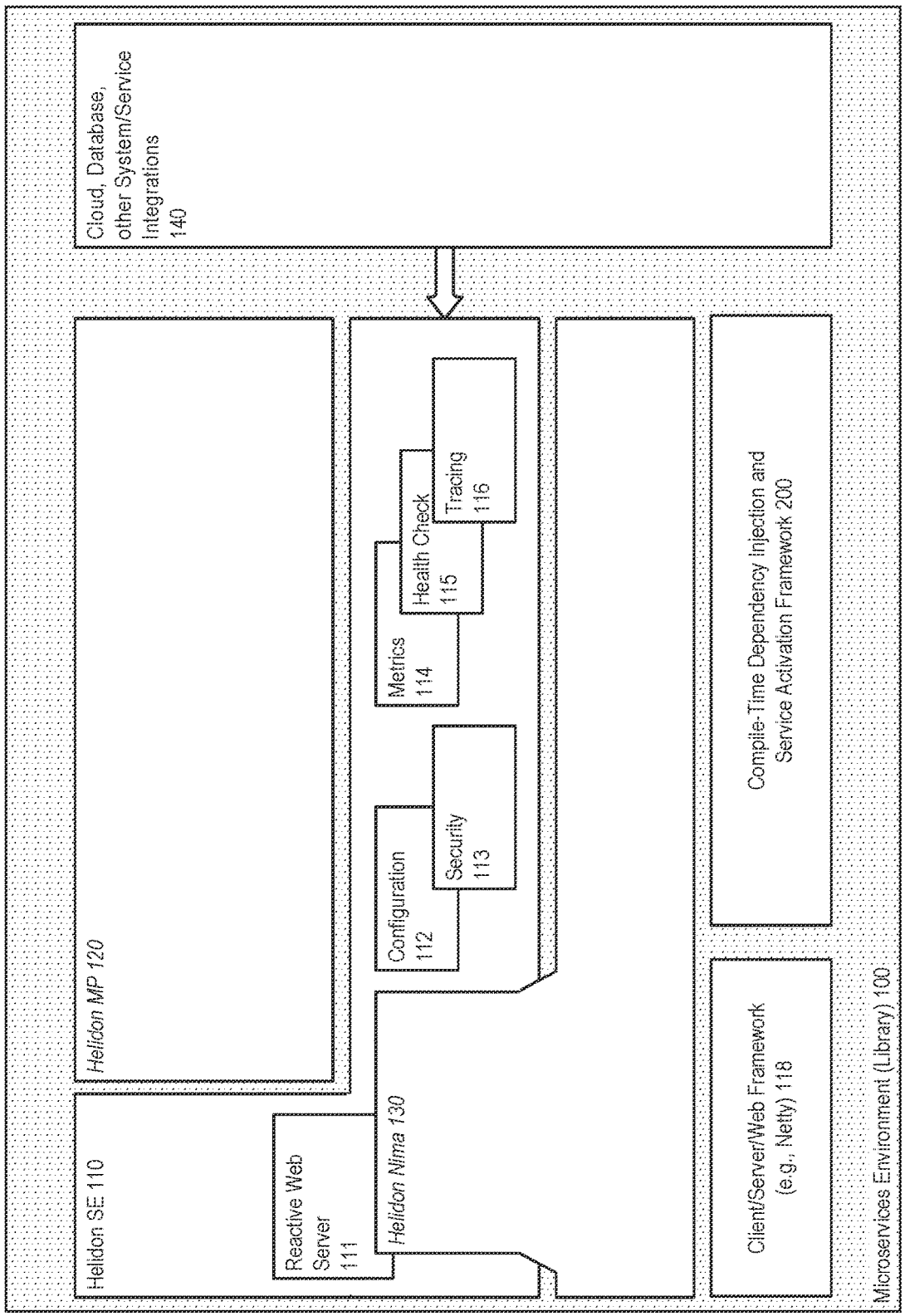
FIG. 2 further illustrates various examples of microservice environments that provide a software development framework, in accordance with an embodiment.

As illustrated in FIG. 2, in accordance with an embodiment, a Helidon SE environment supports a functional programming style that uses the web server, security and configuration components directly; provides the application developer with transparency and control; and supports Java features such as reactive streams, and asynchronous and functional programming.

In accordance with an embodiment, a Helidon SE environment provides a framework by which the application developer can build lightweight reactive microservices. For example, a Helidon SE environment can include various libraries, application program interfaces (APIs), or other components, such as, for example, a reactive web server 111, which provides an asynchronous and reactive API for creating web applications; a configuration API 112, which provides a Java API to load and process configuration properties in key/value form into a config object which an application can then use to retrieve config data; and a security component 113, which provides authentication, authorization, and outbound security; and can also include metrics 114, health check 115, and tracing 116 or other components.

Figure 3:
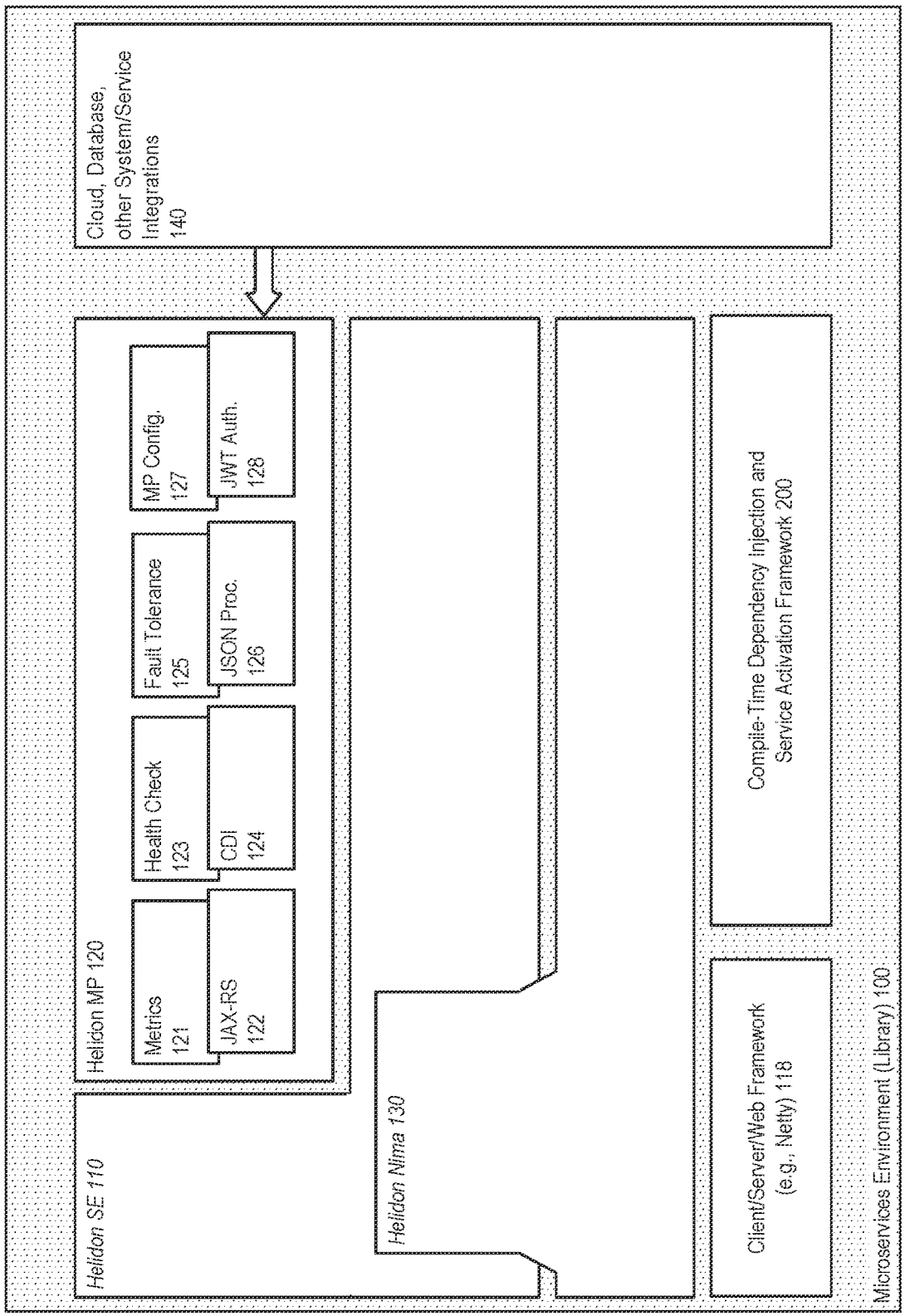
FIG. 3 further illustrates various examples of microservice environments that provide a software development framework, in accordance with an embodiment.

As illustrated in FIG. 3, in accordance with an embodiment, a Helidon MP environment supports a declarative programming style, through the use of a MicroProfile family of APIs built on top of the Helidon libraries. A MicroProfile definition (for example, as specified by the Eclipse MicroProfile project) can be used to support application portability across multiple MicroProfile runtimes.

For example, in accordance with an embodiment, a Helidon MP environment can include various libraries, APIs, or other components, such as, for example, JAX-RS 122, JSON-P 126, CDI 124, metrics 121, health check 123, fault tolerance 125, MicroProfile configuration 137, and JWT authentication 128 components. The web server can be provided by a non-blocking client/server/web framework 118, such as, for example, Netty.

Figure 4:
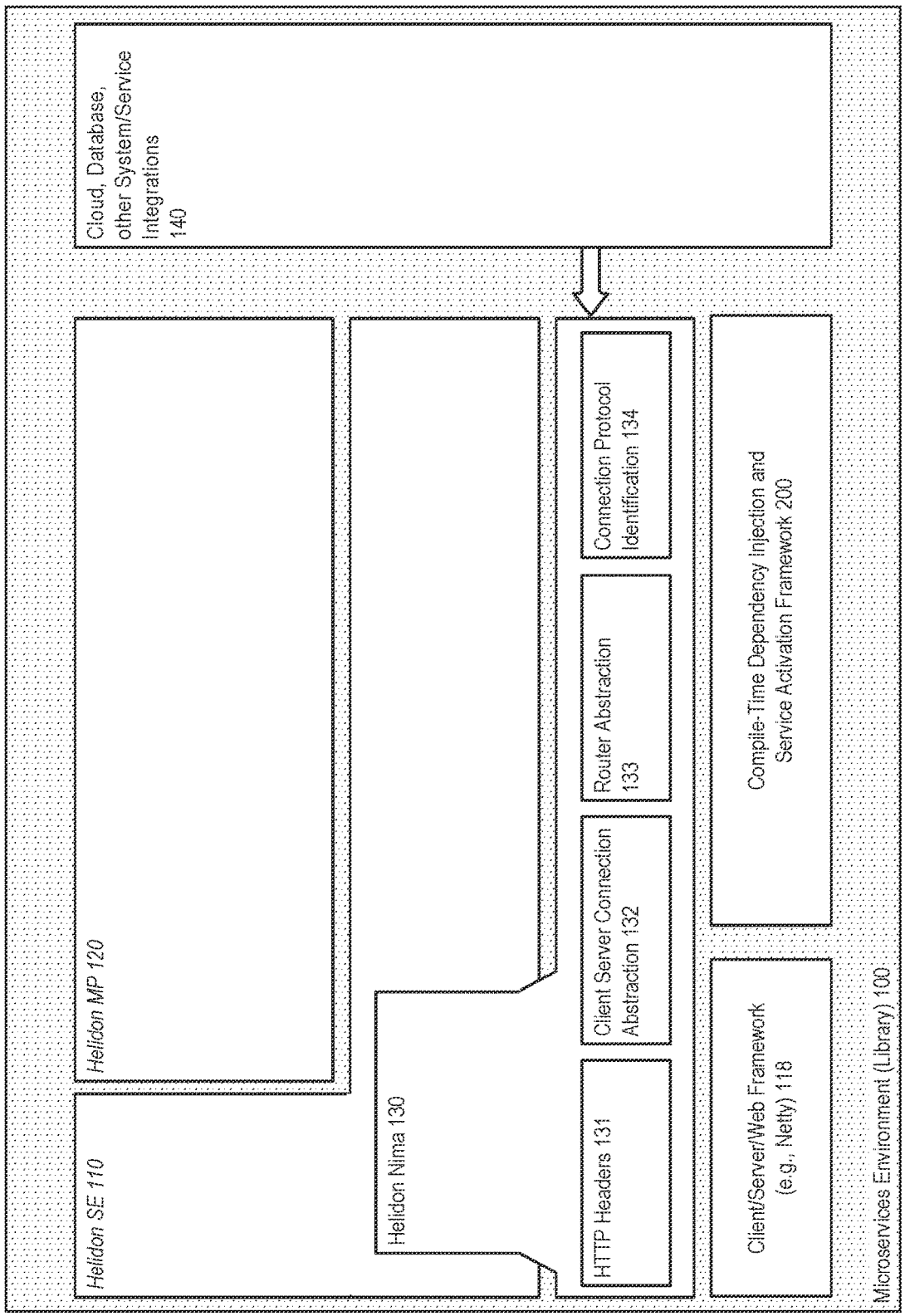
FIG. 4 further illustrates various examples of microservice environments that provide a software development framework, in accordance with an embodiment.

As illustrated in FIG. 4, in accordance with an embodiment, a Helidon Nima environment provides a Loom-based implementation of a web server and related libraries and features usable to build a cloud-native service.

For example, in accordance with an embodiment, a Helidon Nima environment can include the use of various components or features that support, for example: HTTP headers 131, client and server connection abstraction 132, router abstraction 133, and connection protocol identification 134, by which an application developer can build, e.g., blocking (rather than reactive) microservices.

Figure 5:
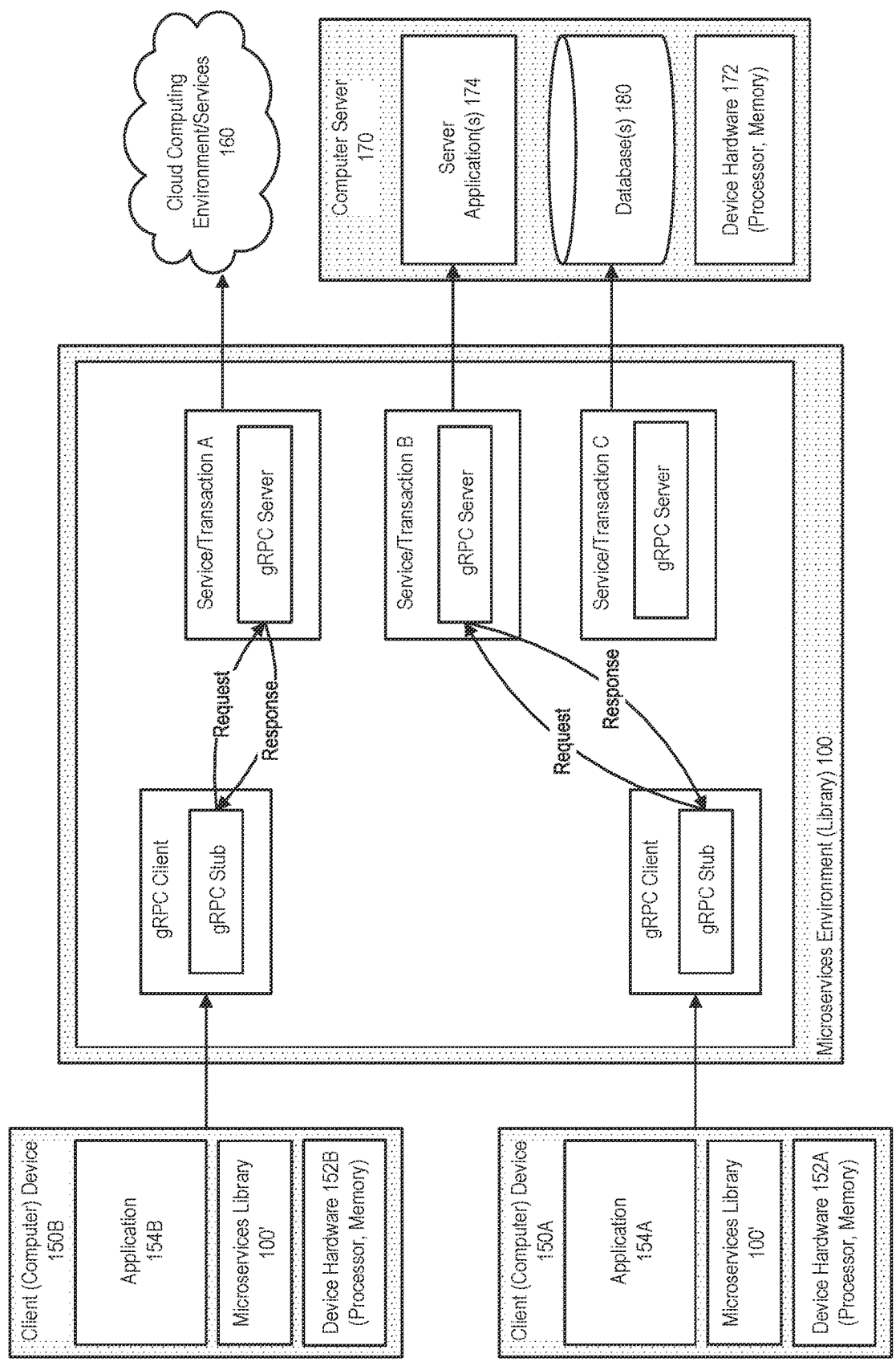
FIG. 5 illustrates the use of a microservice environment to develop applications for use as services in a cloud computing environment, in accordance with an embodiment.

FIG. 5 illustrates the use of a microservice environment to develop applications for use as services in a cloud computing environment, in accordance with an embodiment.

In accordance with an embodiment, a microservice environment presents a software application as a collection of loosely-coupled services that are independently deployable and communicate with one another over a network, for example over a cloud network as might be provided by a cloud computing environment.

For example, in accordance with an embodiment a Helidon microservice environment can support the use of a remote procedure call (e.g., gRPC) framework or component, which enables (client and/or server) applications to communicate within the microservice environment, to build connected systems. A remote procedure call framework enables definition of a service and methods that can be called remotely. A server or service can handle calls from a client, via a local object (stub) that enables a client application to directly call a method on a server application as if it were a local object. The server/service implements methods to handle client calls, including decoding incoming requests, executing service methods, and encoding service responses. The local object (stub) implements the same methods as the service, wrapping the parameters for the call in an appropriate protocol buffer message type, which is then provided as requests to the server.

Figure 6:
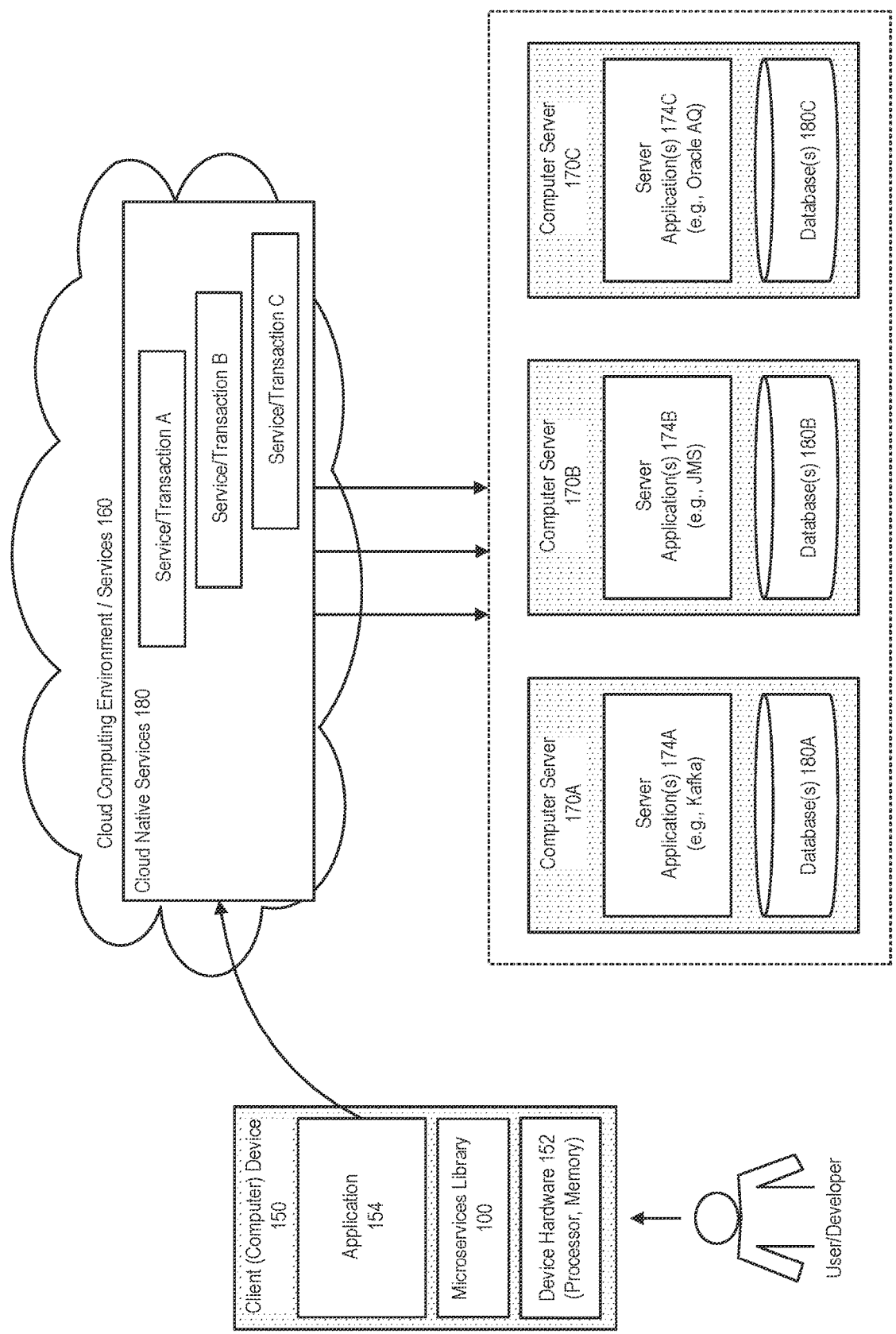
FIG. 6 further illustrates the use of a microservice environment to develop applications for use in a cloud computing environment, in accordance with an embodiment.

FIG. 6 further illustrates the use of a microservice environment to develop applications for use in a cloud computing environment, in accordance with an embodiment.

As illustrated in FIG. 6, in accordance with an embodiment, a microservices library enables access by client applications to communicate with microservices or interact with cloud, database, or other systems or services, for purposes of accessing data, processing transactions, or performing other operations associated with those systems or services.

The examples described above of various embodiments of Helidon microservice environments are provided for purposes of illustrating an example microservice computing environment. In accordance with various embodiments, the systems and methods described herein can be used with other types of microservice environments or computing environments.

Compile-Time Dependency Injection

In accordance with an embodiment, described herein are systems and methods for providing a compile-time dependency injection and lazy service activation framework (referred to herein in some embodiments as Pico) including generation of source code reflecting the dependencies, and which enables an application developer using the system to build microservice applications or cloud-native services.

In accordance with an embodiment, the framework includes the use of a service registry that provides lazy service activation and meta-information associated with one or more services, in terms of interfaces or APIs describing the functionality of each service and their dependencies on other services.

In accordance with an embodiment, an application's use of particular services can be intercepted and accommodated during code generation at compile-time, avoiding the need to use reflection. Extensibility features allow application developers to provide their own templates for code generation, or provide alternative service implementations for use with the application, other than a reference implementation provided by the framework.

In this way, the described system and method provides a minimalist, fully static, compile-time based dependency injection framework, which can be used, for example, with Java applications, and which is compliant with injection specifications such as Java Specification Request 330 "Dependency Injection Standard for Java" (JSR-330).

Figure 7:
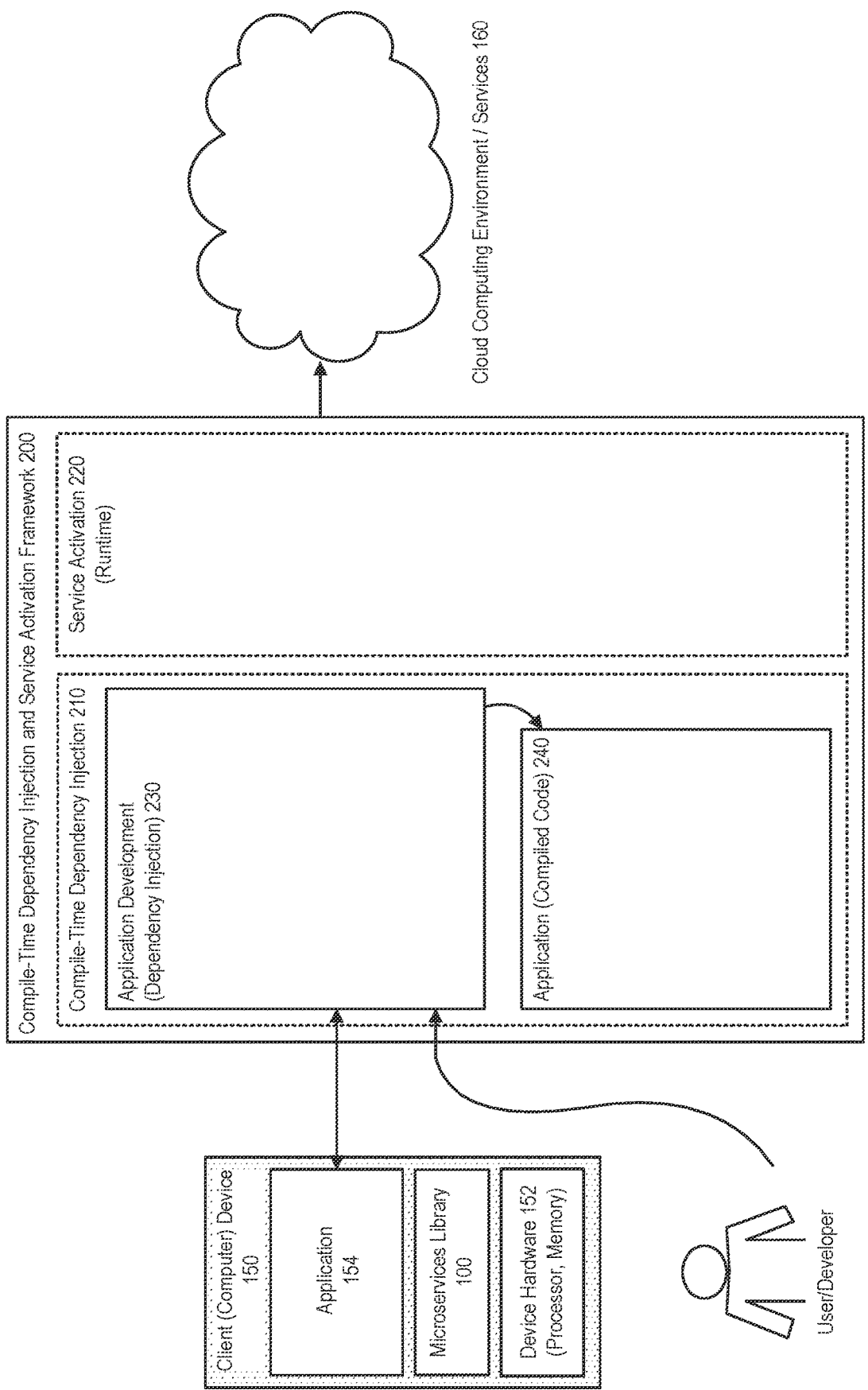
FIG. 7 illustrates a system that provides a compile-time dependency injection and lazy service activation framework, that can be used to develop applications for use in a cloud computing environment, in accordance with an embodiment.

FIG. 7 illustrates a system that provides a compile-time dependency injection and lazy service activation framework, that can be used to develop applications for use in a cloud computing environment, in accordance with an embodiment.

As illustrated in FIG. 7, a user (e.g., application developer) can interact with the compile-time dependency injection and lazy service activation framework 200, including its compile-time dependency injection 210 and service activation 220 features, to develop and compile an application that includes dependency injection 230, and prepare the application as compiled code 240, for activation and execution within a cloud computer environment, for example as a microservice application or cloud-native service.

In accordance with various embodiments, the compile-time dependency injection and lazy service activation framework provides components, processes, and features, including, for example:

Dependency injection—within an application being developed, the assignment of a service instance to a field or method setter that has been annotated accordingly, for example with an injection point (e.g., @inject or another form of dependency-injection annotation).

Injection plan—the process performed by the framework of determining how the application being developed will resolve each injection point associated therewith. An injection plan can optionally be performed by the system at compile-time; alternatively when the injection plan is deferred to runtime it can be resolved by the framework without a need for reflection, which adheres to native image restrictions and provides application performance benefits.

Service—one or more class types in the application being developed, that represent a data processing or logic, e.g., a business logic, such as for example a bean with an @service annotation.

Scope—the cardinality of a service instance in the application being developed.

Singleton—where appropriate, a Singleton (singleton) scope of a service, such as for example jakarta.inject.Singleton or javax.inject.Singleton. This is the default scope for services provided within the framework.

Provided—where appropriate, a provided scope of a service, such as for example jakarta.inject.Provider or javax.inject.Provider. If the scope of a service is not Singleton (as described above) then the scope is considered to be a Provided (provided) scope, and its cardinality will be ascribed to the implementation of the Provider (provider) to determine the cardinality. The provider can optionally use the injection point context to determine the appropriate instance and/or cardinality it provides.

Contract—the process by which a service can alias itself for injection. A contract may be provided as the interface or API, e.g., abstract base class definitions, of a service implementation. Injection points can be included using a contract or service that the framework is aware of, through annotation processing at compile-time.

Qualifier—where appropriate, meta-information or annotations that can be ascribed to other annotations, such as for example jakarta.inject.qualifier or javax.inject.qualifier. In accordance with an embodiment, a built-in qualifier type is @Named in the same package.

Dependency—another way to describe an injection point that represents what, e.g., data processing or logic, is considered to be a dependency, perhaps indicated as qualified or as being optional on another service or contract.

Activator (Service Provider)—the code generated by the framework to lazily activate service instances in the services registry, and to handle resolving dependencies therein, together with injecting the, e.g., fields or methods that are required to be satisfied as part of the activation process.

Services Registry—the collection of all services that are known to the framework and application runtime.

Module—the process or component by which the application being developed will bind services into the services registry, which can be code-generated by the system, and can include, e.g., one module per Java Archive (JAR) or module in the application.

FIGS. 8-11 further illustrate the use of compile-time dependency injection in developing applications, in accordance with an embodiment.

In some software development environments that utilize dependency-injection, application classes are analyzed at run-time to detect injection points, e.g. as described in an accompanying XML or JSON file.

In accordance with an embodiment as described herein, the compile-time dependency injection and lazy service activation framework performs its dependency-injection processing instead at compile-time, using one or more compile-time and/or runtime libraries that can accommodate common use cases.

In accordance with an embodiment, the framework supports the use of inversion-of-control programming model. For example, whereas with a traditional control flow programming model, an application developer prepares application code that defines program calls, e.g., into libraries, to perform particular tasks—an inversion-of-control programming model inverts the flow of control, so that the framework instead calls into the developer-prepared application code, to perform particular tasks.

In accordance with an embodiment, since the framework can operate with abstractions of modules or classes, rather than be required to operate with the specific implementations backing those classes, the framework can be used with Helidon or other microservice environments, examples of which are illustrated above, that allow an application developer to use either a traditional control flow programming model, or an inversion-of-control programming model, depending on their preference and development needs.

In accordance with an embodiment, the framework can also be used beyond or independently of Helidon-type microservice environments, for example to any Java programming or development environment in which an inversion-of-control programming model is desired.

Figure 8:
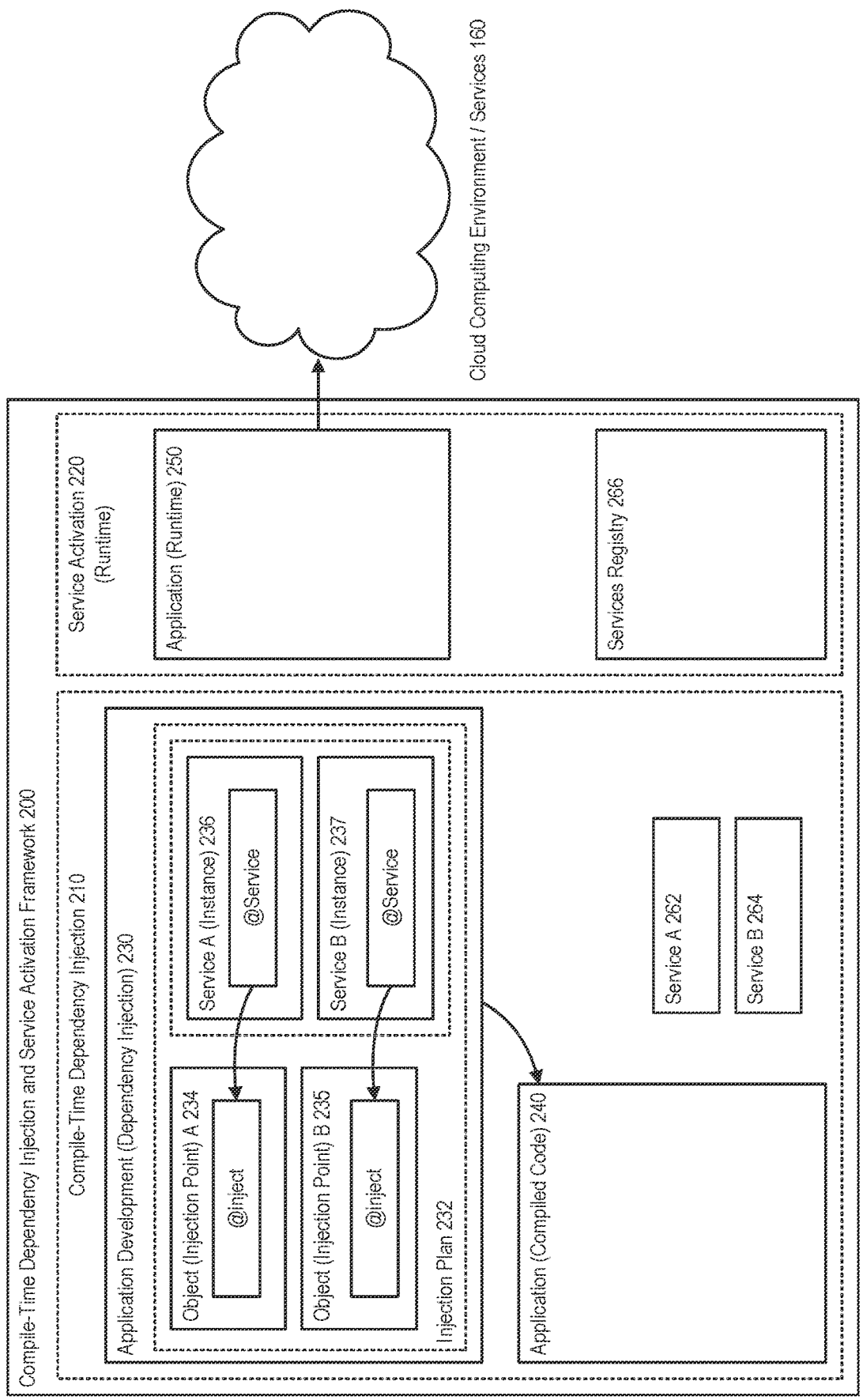
FIG. 8 illustrates the use of compile-time dependency injection in developing applications, in accordance with an embodiment.

As illustrated in FIG. 8, in accordance with an embodiment, each of one or more software objects A 234, B 235 within an application being developed are associated with injection points; which will at compile time be resolved by the framework according to an injection plan 232, to one or more services A 262, B 264, and to provide service instances 236, 237 respectively.

In accordance with an embodiment, software classes are generated by the framework at compile-time, which allows the application developer to examine their application program, and for example, detect potential problems before runtime. Application developers also have an opportunity to look more closely into the generated code. Providers can further extend the framework for use with other source code generation and dependency-injection processes.

For example, JSR-330 provides various types for use in dependency-injection, and allows for backing implementations to be filled in at compile-time. Classes can be generated according to a dependency graph, and plugged into the application at compile-time injection points.

In accordance with an embodiment, the framework can utilize an indication or annotation of types to generate dependencies into the application source code, e.g., JARs, at compile-time, such that the dependencies are provided as, e.g., Java, source code in the application program itself, and has been validated. The process results in an application with a smaller footprint, and improved, e.g., faster, runtime performance.

Figure 9:
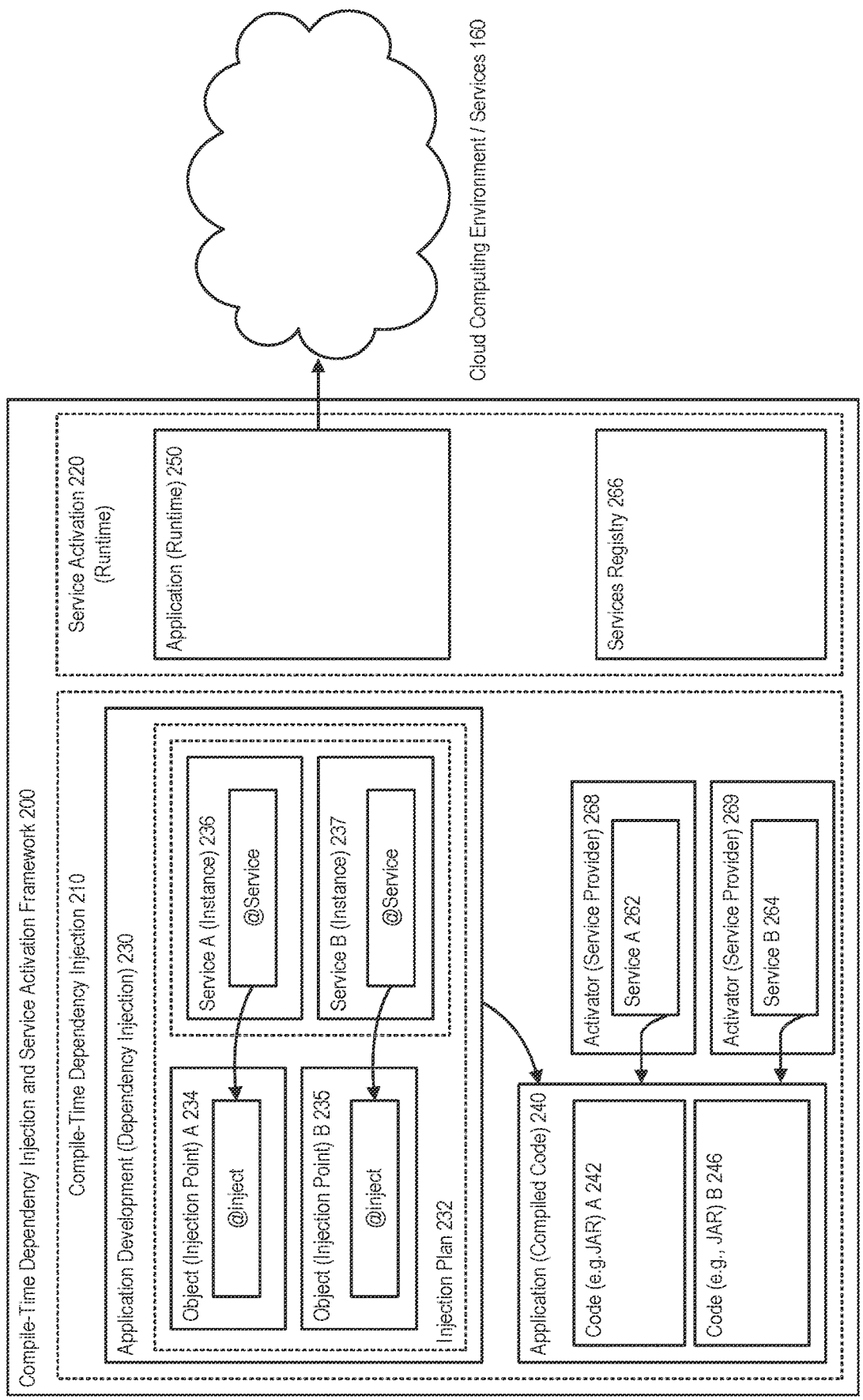
FIG. 9 further illustrates the use of compile-time dependency injection in developing applications, in accordance with an embodiment.

As illustrated in FIG. 9, in accordance with an embodiment, a framework annotation processor looks for, e.g., standard jakarta/javax inject and jakarta/javax annotation types. When these types are found in a class that is being compiled by, e.g., javac, the framework will trigger the creation of an activator (service provider) 268, 269 for that service class/type.

For example, if the application being developed includes a FooImpl class, implementing a Foo interface, and the FooImpl class contains either an @Inject or @singleton annotation, then the presence of either of these annotations will trigger the framework to create an appropriate activator (e.g., Foo mpl$$picoActivator).

In accordance with an embodiment, the activator is used to (a) describe the service in terms of what service contracts (i.e., interfaces) are advertised (for example, in the case of FooImpl as illustrated above, this would include Foo, if Foo is annotated with @Contract or if "io.helidon.pico.autoAddNonContractInterfaces=true" is used at compile-time); and (b) provide a lifecycle for the services including creation, calling injection-based setters, and any, e.g., PostConstruct or PreDestroy methods.

Figure 10:
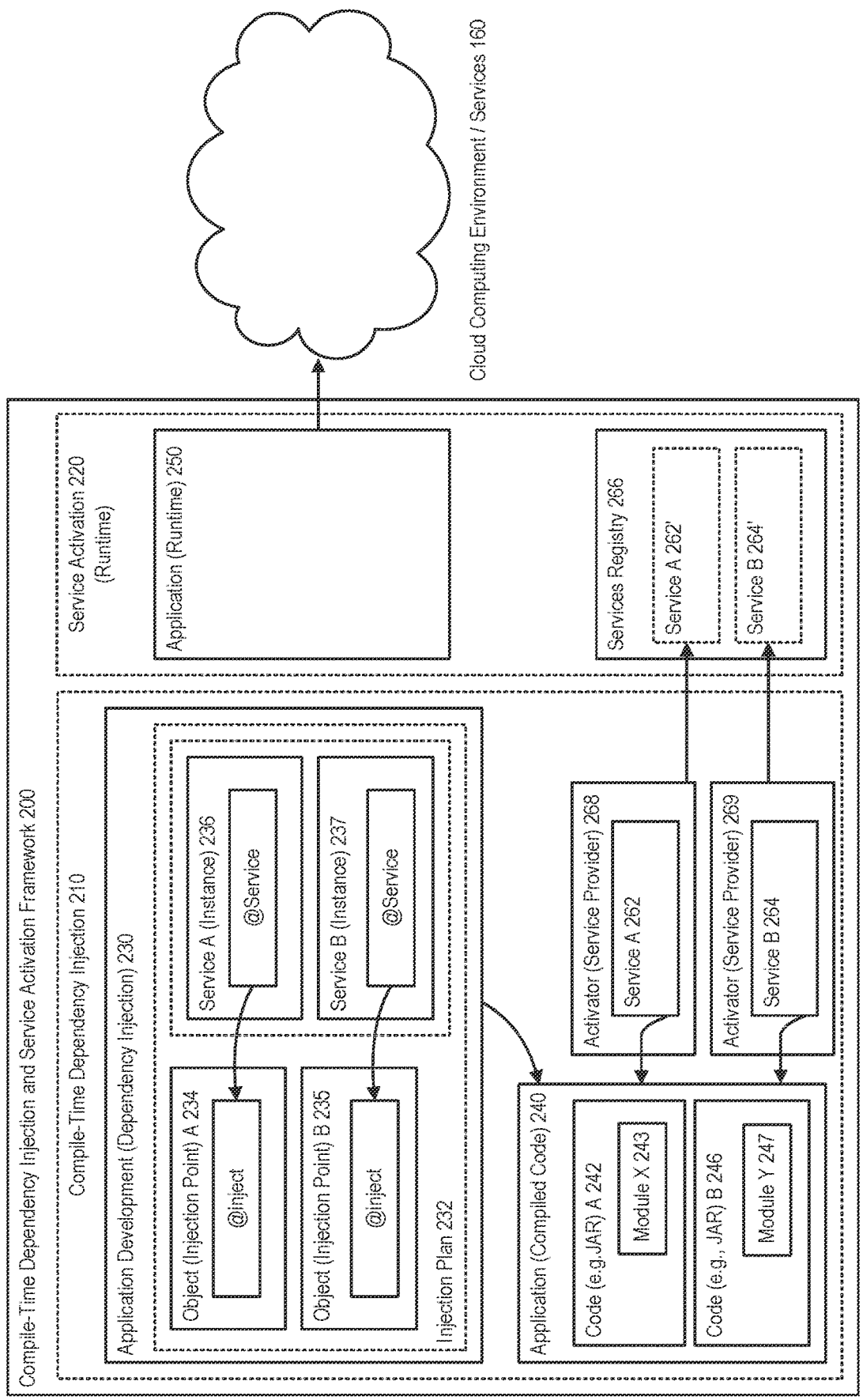
FIG. 10 further illustrates the use of compile-time dependency injection in developing applications, in accordance with an embodiment.

As illustrated in FIG. 10, in accordance with an embodiment, if one or more activators are created at compile-time, then a module X 243, Y 247 (e.g., picoModule) is also created to aggregate the services for the given module.

```
'''
java
@Generated({"provider=oracle",
"generator=io.helidon.pico.tools.creator.impl.DefaultActivatorCreator",
"ver=1.0-SNAPSHOT"})
@Singleton @Named(picoModule.NAME)
public class picoModule implements Module {
    static final String NAME = "pico.examples.logger.common";
    @Override
    public Optional<String> getName( ) {
      return Optional.of(NAME);
    }
    @Override
    public String toString( ) {
      return NAME + ":" + getClass( ).getName( );
    }
    @Override
    public void configure(ServiceBinder binder) {
      binder.bind(io.helidon.pico.examples.logger.common.
        AnotherCommunicationMode$$picoActivator.INSTANCE);
      binder.bind(io.helidon.pico.examples.logger.common.
        Communication$$picoActivator.INSTANCE);
      binder.bind(io.helidon.pico.examples.logger.common.
        DefaultCommunicator$$picoActivator.INSTANCE);
      binder.bind(io.helidon.pico.examples.logger.common.
        EmailCommunicationMode$$picoActivator.INSTANCE);
      binder.bind(io.helidon.pico.examples.logger.common.
        ImCommunicationMode$$picoActivator.INSTANCE);
      binder.bind(io.helidon.pico.examples.logger.common.
```

-continued

```
        LoggerProvider$$picoActivator.INSTANCE);
      binder.bind(io.helidon.pico.examples.logger.common.
        SmsCommunicationMode$$picoActivator.INSTANCE);
    }
}
'''
```

At initialization time, all of the Modules will be located using a service locator (e.g., ServiceLocator) and each service will be bound (268, 269) into the service registry 266.

In accordance with an embodiment, if an annotation in the service is meta-annotated with an InterceptedTrigger annotation, then an extra service type is created. For example, in the case of FooImpl as illustrated above, if FooImpl was found to have such an annotation then a FooImpl$$picoInterceptor would also be created together with an activator for that interceptor. The interceptor would be created with a higher weight than FooImpl, and would therefore be considered "preferred" when a single @inject is used for Foo or FooImpl. If a list is injected, then it would appear towards the head of the list, again avoiding the need for reflection in the generated classes. Any calls to Foo/FooImpl will be interceptable for any Interceptor that is @Named to handle that type name.

Figure 11:
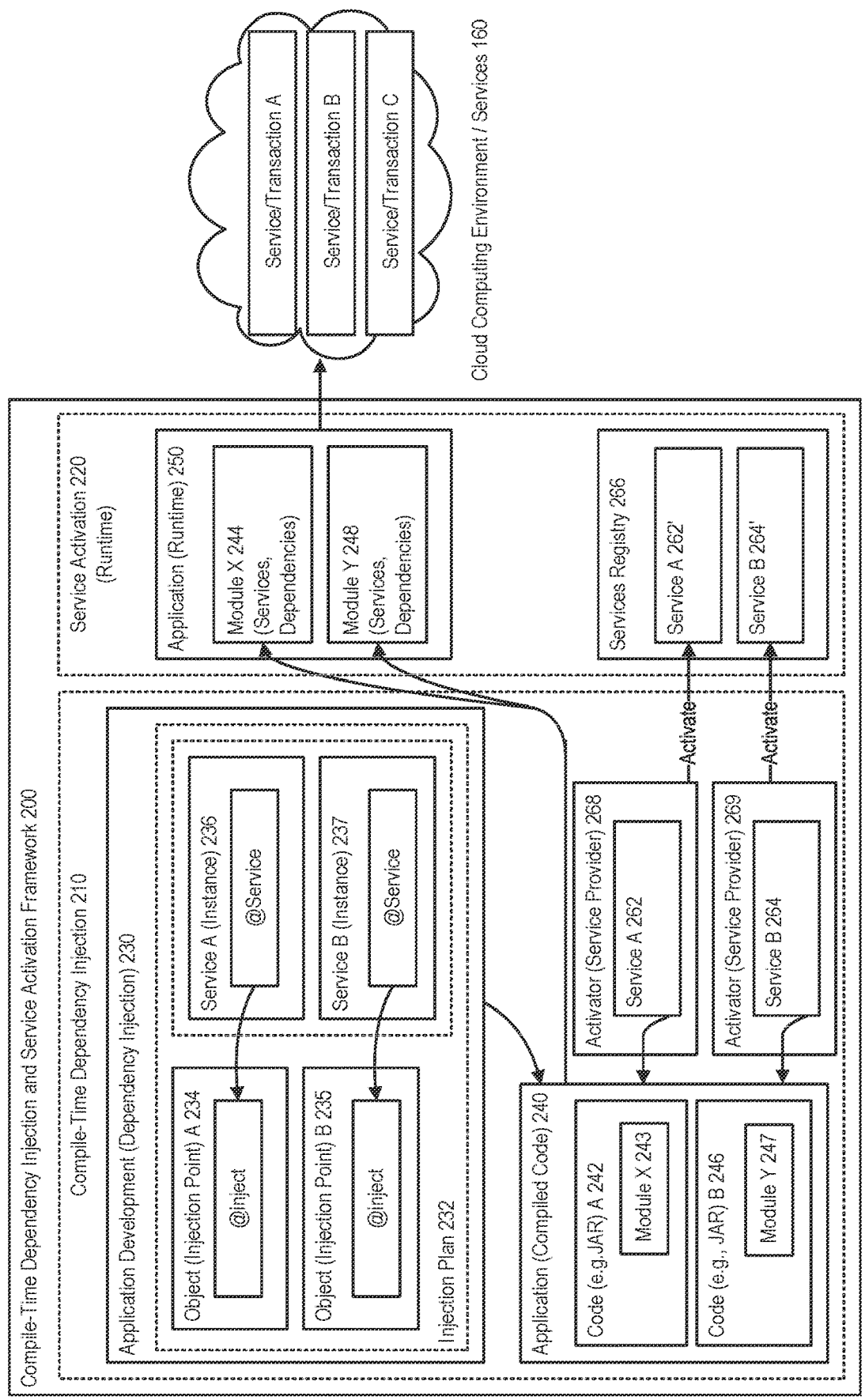
FIG. 11 further illustrates the use of compile-time dependency injection in developing applications, in accordance with an embodiment.

As illustrated in FIG. 11, in accordance with an embodiment, the application as-compiled code, including its modules 244, 248, can then be activated and executed within a cloud computer environment, for example as a microservice application or cloud-native service.

In accordance with an embodiment, optionally a Maven plugin can be used to avoid lookup resolutions at runtime within each service activation. At startup, the framework will attempt to first use the Application module to avoid lookups. A best practice is to apply the maven-plugin to create-application on the maven assembly—this is usually the "final" application module that depends upon every other service/module in your entire deployed application. The maven-plugin can additionally be used to create dependency-injection supporting types (e.g., Activators, Modules, Interceptors, Applications, etc.) from introspecting an external JAR.

In accordance with an embodiment, modules are generated by the framework based on templates, which can be system-provided or user-provided. During compilation, a service can indicate which contracts and dependencies it offers; the framework then provides a reification of every service (and every module) in the application. This provides the application developer a view into the application code, such as for example which particular implementations are being bound to which particular services.

In the following example, the framework generates a suggested module-info.java including analysis of the application injection plan or dependency model:

```
'''
./target/classes/module-info.java.pico
// @Generated({"provider=oracle",
    "generator=io.helidon.pico.tools.creator.impl.DefaultActivatorCreator",
    "ver=1.0-SNAPSHOT"})
module pico.examples.logger.common {
    exports io.helidon.pico.examples.logger.common;
    // pico module - generated by
        io.helidon.pico.tools.creator.impl.DefaultActivatorCreator
    provides io.helidon.pico.spi.Module with
        io.helidon.pico.examples.logger.common.picoModule;
    // pico external contract usage - generated by
        io.helidon.pico.tools.creator.impl.DefaultActivatorCreator
    requires pico.examples.logger.common;
```

-continued

```
    uses io.helidon.pico.examples.logger.common.CommunicationMode;
    uses io.helidon.pico.examples.logger.common.Communicator;
    uses jakarta.inject.Provider;
    uses javax.inject.Provider;
    // pico - generated by
        io.helidon.pico.tools.creator.impl.DefaultActivatorCreator
        requires transitive io.helidon.pico;
    // pico application - generated by
        io.helidon.pico.maven.plugin.ApplicationCreatorMojo
    provides io.helidon.pico.spi.Application with
  io.helidon.pico.examples.logger.common.picoApplication;
}
'''
```

In the above example the framework can determine or infer what this module exports; and which modules are required because of which external contracts, for use during compilation of the application.

Extensible SPI

In accordance with an embodiment, the compile-time dependency injection and lazy service activation framework provides an extensible, SPI-based mechanism, which allows services provided to be overridden, extended, or replaced with a different implementation than what is provided out of the built-in reference implementation modules included. In order to be a provider implementation, the provider must supply an implementation for PicoServices discoverable by the service loader (ServiceLoader) with a higher-than-default Weight.

In accordance with an embodiment, SPI class definitions from the io.helidon.pico.spi package are considered primordial and therefore should not participate in injection or conventionally be considered injectable. Service classes that are not targets for injection should be represented under/META-INF/servicesRserviceClassName> to be found by the standard service locator (ServiceLocator).

Providers are encouraged to fail-fast during compile-time, which implies a set of tooling that can be applied to create and validate the integrity of the dependency graph at compile-time instead of at runtime. Providers are also encouraged to avoid reflection completely at runtime; and to advertise capabilities and configuration using, e.g., PicoServicesConfig.

Modules

In accordance with an embodiment, the compile-time dependency injection and lazy service activation framework provides various modules, including for example:

An api module—an API and SPI for the framework (e.g. Pico); which depends on jakarta-inject and jakarta-annotations. Required as a maven compile-time dependency for runtime consumption.

A pico module—contains the default JSR-330 implementation of the (Pico) API/SPI; depends on the api module. Requires as a maven compile-time dependency for runtime consumption.

A tools module—contains the libraries for template-based code generation and model validation tooling. Only required at build time and is not required at runtime.

A processor module—contains the libraries for annotation processing; depends on tools. Only required at build time and is not required at runtime.

A maven-plugin module—provides code generation wrappers for maven; depends on tools. Only required at build time and is not required at runtime.

Types Module

In accordance with an embedment, a types module contains types that are generically applicable to any (e.g., Pico-based) application implementation. The API is consumer-facing and small since most of the supporting types actually come from the javax/jakarta inject and annotations modules. The SPI package supports the runtime implementation and is generally not of interest to the majority of application developers using dependency-injection. The only aspect of the SPI that needs to be used directly is the PicoServices and Services classes since these are used activate one or more of the startup services that comprise the (Pico) application.

Tools Module

In accordance with an embodiment, a default-tools module is responsible for providing basic tooling around code generation and dependency model analysis during compile-time. All services are standard ServiceLocator based, and all use a standard request/response mechanism in the API.

io.helidon.pico.tools.creator.ApplicationCreator

This tool creates the, e.g., picoApplication.

io.helidon.pico.tools.creator.ActivatorCreator

This tool creates the, e.g., picoActivator(s) and picoModule(s).

io.helidon.pico.tools.creator.ExternalModuleCreator

This tool creates the request to analyze a third-party JAR, and then generates the request payload appropriate to hand off to the ActivatorCreator tool to generate the code.

io.helidon.pico.tools.creator.InterceptorCreator

This tool is called when an InterceptorTrigger is found on a service that requires interception.

Processor Module

In accordance with an embodiment, a default-tools-processor module provides compile-time only annotation processing, and is designed to look for javax/jakarta inject type annotations and then code-generate supporting dependency-injection classes to support the dependency-injection model in a standard, e.g., JSR-330 compliant, manner at runtime, including leveraging a tools module to perform the necessary code generation when these annotations are found.

By way of example, during creation of their application, the application developer can modify a pom.xml to add this plugin to be run as part of the compilation phase:

```
'''
<plugin>
    <groupId>org.apache.maven.plugins</groupId>
    <artifactId>maven-compiler-plugin</artifactId>
    <configuration>
        <forceJavacCompilerUse>true</forceJavacCompilerUse>
        <annotationProcessorPaths>
            <path>
                <groupId>io.helidon.pico</groupId>
                <artifactId>helidon-pico-processor</artifactId>
                <version>${helidon.version}</version>
            </path>
            <!-- optionally handle javax also (the default is jakarta.*) -->
            <path>
                <groupId>javax.inject</groupId>
                <artifactId>javax.inject</artifactId>
                <version>${javax.injection.version}</version>
            </path>
            <path>
                <groupId>javax.annotation</groupId>
                <artifactId>javax.annotation-api</artifactId>
                <version>${javax.annotations.version}</version>
            </path>
        </annotationProcessorPaths>
    </configuration>
</plugin>
'''
```

Additional Features

In accordance with an embodiment, the compile-time dependency injection and lazy service activation framework provides a means to generate "Activators" (the dependency-injection supporting types) for externally-built modules as well as supporting javax annotated types.

In accordance with an embodiment, if a service contains an annotation that itself is annotated with InterceptorTrigger, then the code that is generated for that service will support interception. The compile-time dependency injection and lazy service activation framework provides meta-information for each service in its service registry, including such information as what contracts are provided by each service as well as describing its dependencies.

In accordance with an embodiment, the compile-time dependency injection and lazy service activation framework generates a proposed module-info.java file for your module (look for module-info.java.pico under ./target/classes or ./target/test-classes).

In accordance with an embodiment, the compile-time dependency injection and lazy service activation framework provides a maven plugin that allows the injection graph to be (a) validated for completeness, and (b) deterministically bound to the service implementation—at compile-time. This is demonstrated in each of the examples, the result of which leads to early detection of issues at compile-time instead of at runtime as well as a marked performance enhancement.

In accordance with an embodiment, a Testable(*)Services module t offers a set of types in order to facility for creating fake/mock services for various testing scenarios.

```
'''
    <dependency>
        <groupId>io.helidon.pico</groupId>
        <artifactId>helidon-pico-test-support</artifactId>
        <version>${helidon.version}</version>
        <scope>test</scope>
    </dependency>
'''
```

In accordance with an embodiment, the framework is designed to by extended either at a micro level (application developers can override mustache/handlebar templates) to the macro level (application developers can provide their own implementation of the SPI).

Example Method

Figure 12:
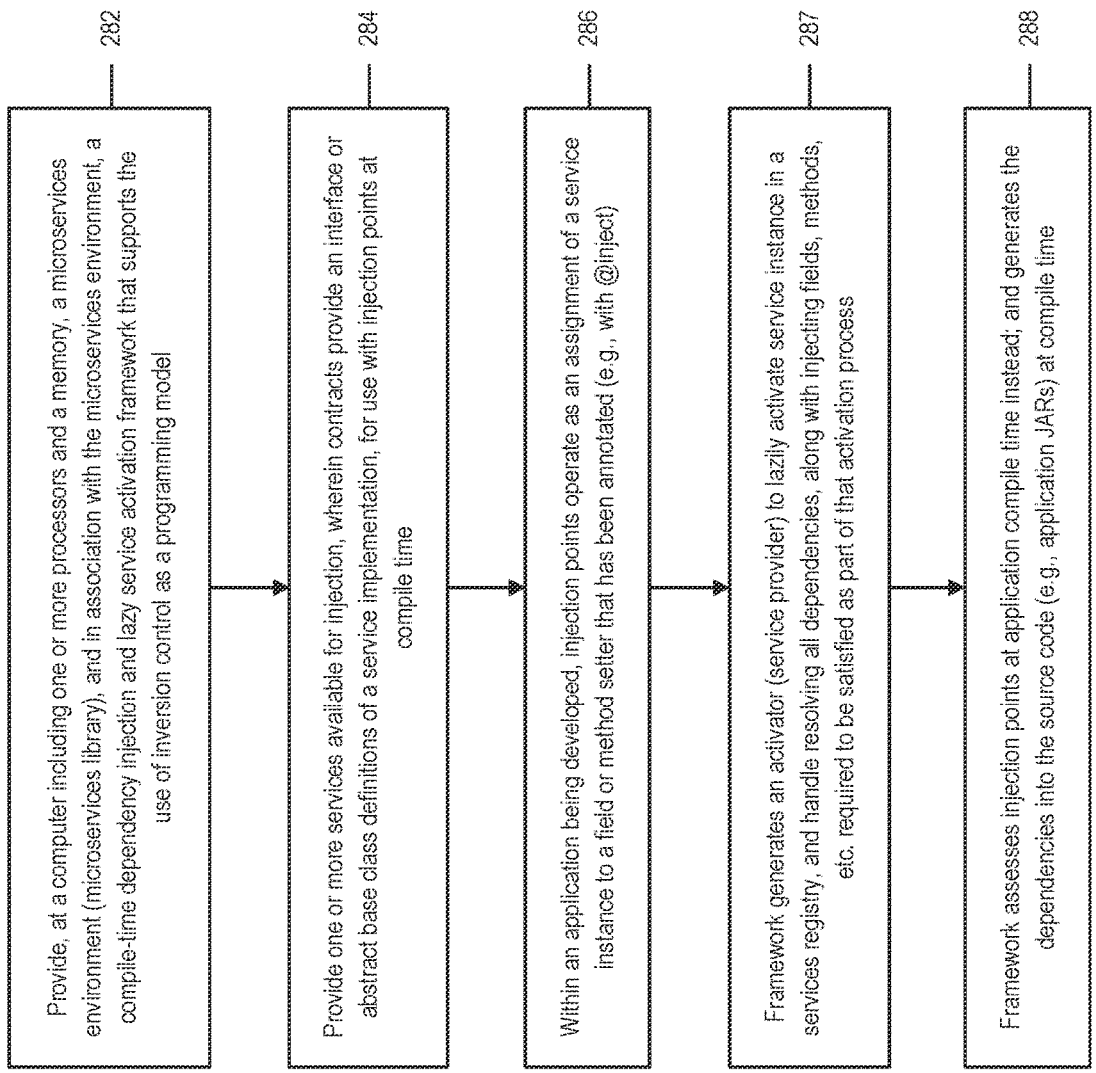
FIG. 12 illustrates a method of using a compile-time dependency injection and lazy service activation framework to develop applications for use in a cloud computing environment, in accordance with an embodiment.

FIG. 12 illustrates a method of using a compile-time dependency injection and lazy service activation framework to develop applications for use in a cloud computing environment, in accordance with an embodiment.

As illustrated in FIG. 12, in accordance with an embodiment, at step 282, a computer including one or more processors and a memory provides a microservice environment (microservices library), and in association with the microservice environment, a compile-time dependency injection and lazy service activation framework that supports the use of inversion control as a programming model.

At step 284, one or more services are made available for injection, wherein contracts provide an interface or abstract base class definitions of a service implementation, for use with injection points at compile-time.

At step 286, within an application being developed, injection points operate as an assignment of a service instance to a field or method setter that has been annotated with @inject or another form of dependency-injection annotation.

At step 287, the framework generates an activator (service provider) to lazily activate service instance in a services registry, and handle resolving all dependencies, together with injecting fields, methods, etc. required to be satisfied as part of that activation process.

At step 288, the framework assesses injection points at application compile-time instead, and generates the dependencies into the application source code (e.g., as application JARs).

Example Development Process

In accordance with an embodiment, the compile-time dependency injection and lazy service activation framework enables an application developer to build microservice applications or cloud-native services.

By way of example, to illustrate the development process, during creation of their application, the application developer can add annotations to a pom.xml or gradle.build file, for example:

Annotation Processor Dependency/Path:

```
'''
    <groupId>io.helidon.pico</groupId>
    <artifactId>helidon-pico-processor</artifactId>
    <version>${helidon.version}</version>
'''
```

Compile-Time Dependency:

```
'''
    <dependency>
        <groupId>io.helidon.pico</groupId>
        <artifactId>helidon-pico</artifactId>
        <version>${helidon.version}</version>
    </dependency>
'''
```

In accordance with an embodiment, the application can be developed using standard jakarta.inject.* and jakarta.annotation.* types; and then built; and run. Since the framework effectively owns the creation of services in accordance with the scope each service is declared as, the application developer must create a demand for initial service(s) instead of calling new directly in the application code. This can be accomplished by looking up the service directly using the Services SPI, for example:

```
'''
    Services services = PicoServices.getPicoServices( ).
        orElseThrow( ).getServices( );
    ServiceProvider<Library> librarySp =
    services.lookupFirst(Library.class);
    System.out.println("found a library provider: " +
        librarySp.getDescription( ));
    Library library = librarySp.get( );
'''
```

In accordance with an embodiment, if there are a collection of services requiring activation at startup, then those service implementation types can be annotated with RunLevel(RunLevel.STARTUP) and an appropriate code provide in main( ) to lazily activate those services.

Whenever list-based injection is used, all services matching the injection criteria will be in the injected (and immutable) list. The list will be in order according to the Weight annotation value, ranking from the highest weight to the lowest weight. If services are not weighted explicitly, then a default weight is assigned. If the weight is the same for two services, then the secondary ordering will be based on the FN class name of the service types.

While Weight determines list order, the RunLevel annotation is used to rank the startup ordering, from the lowest value to the highest value, where RunLevel.STARTUP=0. The application developer is expected to activate these directly using code such as the following (wherein the get ( ) lazily creates & activates the underlying service type):

```
List<ServiceProvider<Object>> startupServices = services
    .lookup(DefaultServiceInfo.builder( )
    .runLevel(RunLevel.STARTUP).build( ), true);
startupServices.stream( ).forEach(ServiceProvider::get);
```

If the ordering of the list of services is important, the application developer can use the Weight and/or RunLevel annotations to establish the priority, weighted ordering, or startup ordering.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although various embodiments of the systems and methods described herein illustrate usage in a Helidon microservice environment, various embodiments can be used with other types of microservice environments or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a microservices or other computing environment, comprising:
   a computer including one or more processors, that provides access to a microservices or other computing environment for use with software applications or services; and
   a compile-time dependency injection and lazy service activation framework including source code generation, which is usable to build microservice applications or cloud-native services;
   wherein the compile-time dependency injection and lazy service activation framework includes a services registry that describes a functionality of services that are known to the framework and their dependencies on other services;
   wherein for an application being developed:
      one or more services are made available for injection;
      within the application being developed, injection points operate as an assignment of a service instance to a field or method setter that has been annotated accordingly;
      the compile-time dependency injection and lazy service activation framework generates an activator including code to lazily activate service instances in the services registry and to handle resolving dependencies required to be satisfied as part of an activation process, together with injecting fields or methods that are required to be satisfied as part of the activation process; and
      the compile-time dependency injection and lazy service activation framework assesses injection points at compile-time, and generates the dependencies into the source code of the application being developed;
   wherein each of a plurality of software objects within the application being developed are associated with injection points;
   wherein the injection points are at compile-time resolved by the compile-time dependency injection and lazy service activation framework according to an injection plan to one or more of a plurality of services, and to provide a plurality of service instances respectively.

2. The system of claim 1, wherein the services registry provides lazy service activation and meta-information associated with one or more services, in terms of interfaces or APIs describing the functionality of each service and their dependencies on other services.

3. The system of claim 1, wherein the application's use of particular services can be intercepted and accommodated during code generation at compile-time, avoiding the need to use reflection.

4. The system of claim 1, wherein the compile-time dependency injection and lazy service activation framework is provided for use with a Helidon or other microservice development environment.

5. The system of claim 1, wherein the compile-time dependency injection and lazy service activation framework is used to build microservice applications or cloud-native services, for execution within a cloud computing environment.

6. A method for use with a microservices or other computing environment, comprising:
   providing, in association with a microservices or other computing environment for use with software applications or services, a compile-time dependency injection and lazy service activation framework including source code generation, which is usable to build microservice applications or cloud-native services;
   wherein the compile-time dependency injection and lazy service activation framework includes a services registry that describes a functionality of services that are known to the framework and their dependencies on other services;

wherein for an application being developed:

one or more services are made available for injection;

within the application being developed, injection points operate as an assignment of a service instance to a field or method setter that has been annotated accordingly;

the compile-time dependency injection and lazy service activation framework generates an activator including code to lazily activate service instances in the services registry and to handle resolving dependencies required to be satisfied as part of an activation process, together with injecting fields or methods that are required to be satisfied as part of the activation process; and the compile-time dependency injection and lazy service activation framework assesses injection points at compile-time, and generates the dependencies into the source code of the application being developed;

wherein each of a plurality of software objects within the application being developed are associated with injection points;

wherein the injection points are at compile-time resolved by the compile-time dependency injection and lazy service activation framework according to an injection plan to one or more of a plurality of services, and to provide a plurality of service instances respectively.

7. The method of claim 6, wherein the services registry provides lazy service activation and meta-information associated with one or more services, in terms of interfaces or APIs describing the functionality of each service and their dependencies on other services.

8. The method of claim 6, wherein the application's use of particular services can be intercepted and accommodated during code generation at compile-time, avoiding the need to use reflection.

9. The method of claim 6, wherein the compile-time dependency injection and lazy service activation framework is provided for use with a Helidon or other microservice development environment.

10. The method of claim 6, wherein the compile-time dependency injection and lazy service activation framework is used to build microservice applications or cloud-native services, for execution within a cloud computing environment.

11. A non-transitory computer readable storage medium, including instructions stored thereon which when read and executed by one or more computers cause the one or more computers to perform the steps comprising:

providing, in association with a microservices or other computing environment for use with software applications or services, a compile-time dependency injection and lazy service activation framework including source code generation, which is usable to build microservice applications or cloud-native services;

wherein the compile-time dependency injection and lazy service activation framework includes a services registry that describes a functionality of services that are known to the framework and their dependencies on other services;

wherein for an application being developed:

one or more services are made available for injection;

within the application being developed, injection points operate as an assignment of a service instance to a field or method setter that has been annotated accordingly;

the compile-time dependency injection and lazy service activation framework generates an activator including code to lazily activate service instances in the services registry and to handle resolving dependencies required to be satisfied as part of an activation process, together with injecting fields or methods that are required to be satisfied as part of the activation process; and the compile-time dependency injection and lazy service activation framework assesses injection points at compile-time, and generates the dependencies into the source code of the application being developed;

wherein each of a plurality of software objects within the application being developed are associated with injection points;

wherein the injection points are at compile-time resolved by the compile-time dependency injection and lazy service activation framework according to an injection plan to one or more of a plurality of services, and to provide a plurality of service instances respectively.

12. The non-transitory computer readable storage medium of claim 11, wherein the services registry provides lazy service activation and meta-information associated with one or more services, in terms of interfaces or APIs describing the functionality of each service and their dependencies on other services.

13. The non-transitory computer readable storage medium of claim 11, wherein the application's use of particular services can be intercepted and accommodated during code generation at compile-time, avoiding the need to use reflection.

14. The non-transitory computer readable storage medium of claim 11, wherein the compile-time dependency injection and lazy service activation framework is provided for use with a Helidon or other microservice development environment.

15. The non-transitory computer readable storage medium of claim 11, wherein the compile-time dependency injection and lazy service activation framework is used to build microservice applications or cloud-native services, for execution within a cloud computing environment.

* * * * *